United States Patent
Bonola

(10) Patent No.: US 8,041,896 B2
(45) Date of Patent: Oct. 18, 2011

(54) VIRTUALIZATION PLATFORM WITH DEDICATED CACHE ACCESS

(75) Inventor: Thomas J. Bonola, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 619 days.

(21) Appl. No.: 12/113,076

(22) Filed: Apr. 30, 2008

(65) Prior Publication Data

US 2009/0276607 A1    Nov. 5, 2009

(51) Int. Cl.
*G06F 12/08* (2006.01)
*G06F 9/30* (2006.01)

(52) U.S. Cl. ............... 711/133; 711/137; 711/E12.061; 711/E12.036; 712/209

(58) Field of Classification Search .................. 711/125, 711/133, 134, 137, 141, 206, E12.061, E12.036
See application file for complete search history.

(56) References Cited

U.S. PATENT DOCUMENTS

| | | | |
|---|---|---|---|
| 6,014,728 A * | 1/2000 | Baror | 711/133 |
| 6,044,478 A * | 3/2000 | Green | 711/141 |
| 6,272,598 B1 * | 8/2001 | Arlitt et al. | 711/133 |
| 7,565,493 B1 * | 7/2009 | Todd et al. | 711/137 |
| 2003/0191900 A1 | 10/2003 | Hooker | |
| 2004/0158680 A1 | 8/2004 | Hooker | |
| 2004/0158682 A1 | 8/2004 | Hooker | |
| 2005/0080997 A1 | 4/2005 | Hooker | |
| 2005/0102492 A1 | 5/2005 | Henry et al. | |

* cited by examiner

*Primary Examiner* — Pierre-Michel Bataille

(57) ABSTRACT

A computing system supports a virtualization platform with dedicated cache access. The computing system is configured for usage with a memory and a cache and comprises an instruction decoder configured to decode a cache-line allocation instruction and control logic. The control logic is coupled to the instruction decoder and controls the computing system to execute a cache-line allocation instruction that loads portions of data and code regions of the memory into dedicated cache-lines of the cache which are exempted from eviction according to a cache controller replacement policy.

20 Claims, 6 Drawing Sheets

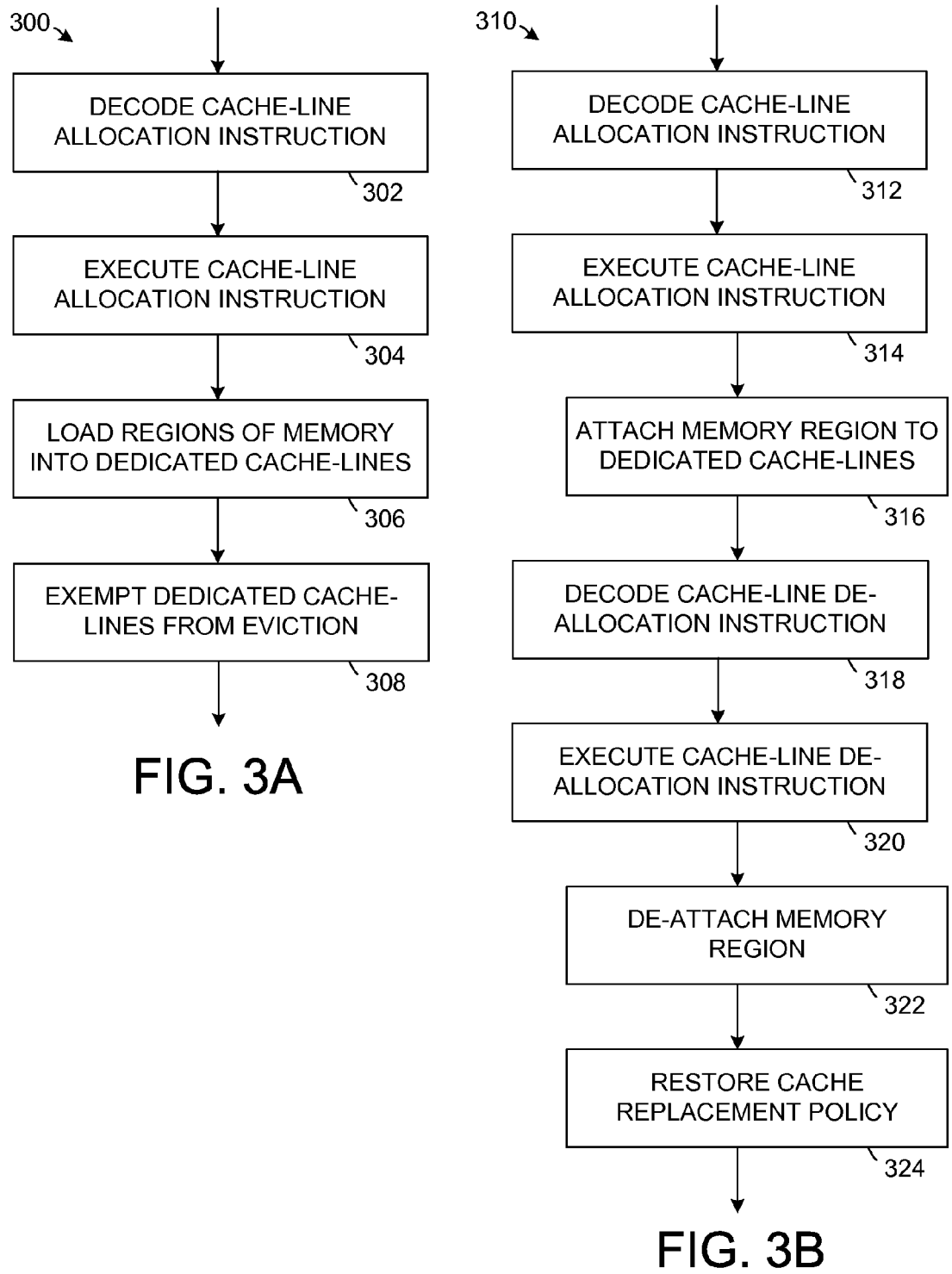

VIRTUALIZATION PLATFORM WITH DEDICATED CACHE ACCESS

BACKGROUND

Virtual machine technology is used to create and concurrently run one or more guest operating systems on a physical device. One or more virtual machines can operate on a single host computing system, each including an operating system with concurrent applications.

Increases in data center density and complexity lead to increased demand for information technology efficiency and responsiveness. Thus, various operational aspects of virtualization increase in importance.

SUMMARY

Embodiments of a computing system support a virtualization platform with dedicated cache access. The computing system is configured for usage with a memory and a cache and comprises an instruction decoder configured to decode a cache-line allocation instruction and control logic. The control logic is coupled to the instruction decoder and controls the computing system to execute a cache-line allocation instruction that loads portions of data and code regions of the memory into dedicated cache-lines of the cache which are exempted from eviction according to a cache controller replacement policy.

BRIEF DESCRIPTION OF THE DRAWINGS

Embodiments of the invention relating to both structure and method of operation may best be understood by referring to the following description and accompanying drawings:

FIGS. 3A through 3D are flow charts illustrating one or more embodiments or aspects of a computer-executed method for managing a virtualization platform with dedicated cache access.

DETAILED DESCRIPTION

Various embodiments of a method for accelerating a virtual machine monitor (VMM or hypervisor) guarantee that data reads and code execution performance occur at maximum processor core rates and 100% cache hits.

The illustrative techniques and associated computing structures add new processor instructions which allow virtualization software to load portions of the virtualization platform data and code memory regions into dedicated cache-lines that are never evicted as part of the cache controller's replacement policy (for example, typically a least recently used (LRU) algorithm).

Deployment of platform virtualization software drives increasingly stringent requirements to address performance burdens encountered by hosting multiple operating systems on a single physical server. A possible technique for addressing the increased load on resources is introduction of cache-based instructions such as a prefetch (PREFETCHh) instruction that enable software to manipulate access to data in cache. For example, the prefetch instruction can enable manipulation of cache "temperature" for data which is soon to be accessed by software. Unfortunately, such instructions are speculative and do not guarantee that the data will be "warm" by the time software is ready to use the data.

In an example implementation, two new processor instructions CLALLOC/CLFREE guarantee maximum performance for data and code accesses by system software. A virtualization platform such as a hypervisor or virtual machine manager (VMM) that is responsible for global resource scheduling between multiple guest operating systems can be guaranteed to execute critical algorithms at maximum core frequency to meet scheduling deadlines. Example operations include various hypervisor services such as page shadowing, exception handling, load-balancing, and memory management.

The CLALLOC instruction can be called by the hypervisor to "pin" specific regions of critical code and data to specific cache-lines in the cache. For example, a four-way set associative cache arrangement allows one-way in a set to be reserved for memory regions passed to the CLALLOC instruction. The "pinned" ways are never evicted as part of the cache controller replacement policy. The CLFREE instruction unpins the previously allocated ways and permits the ways to participate in the cache controller's replacement policy.

Figure 1:
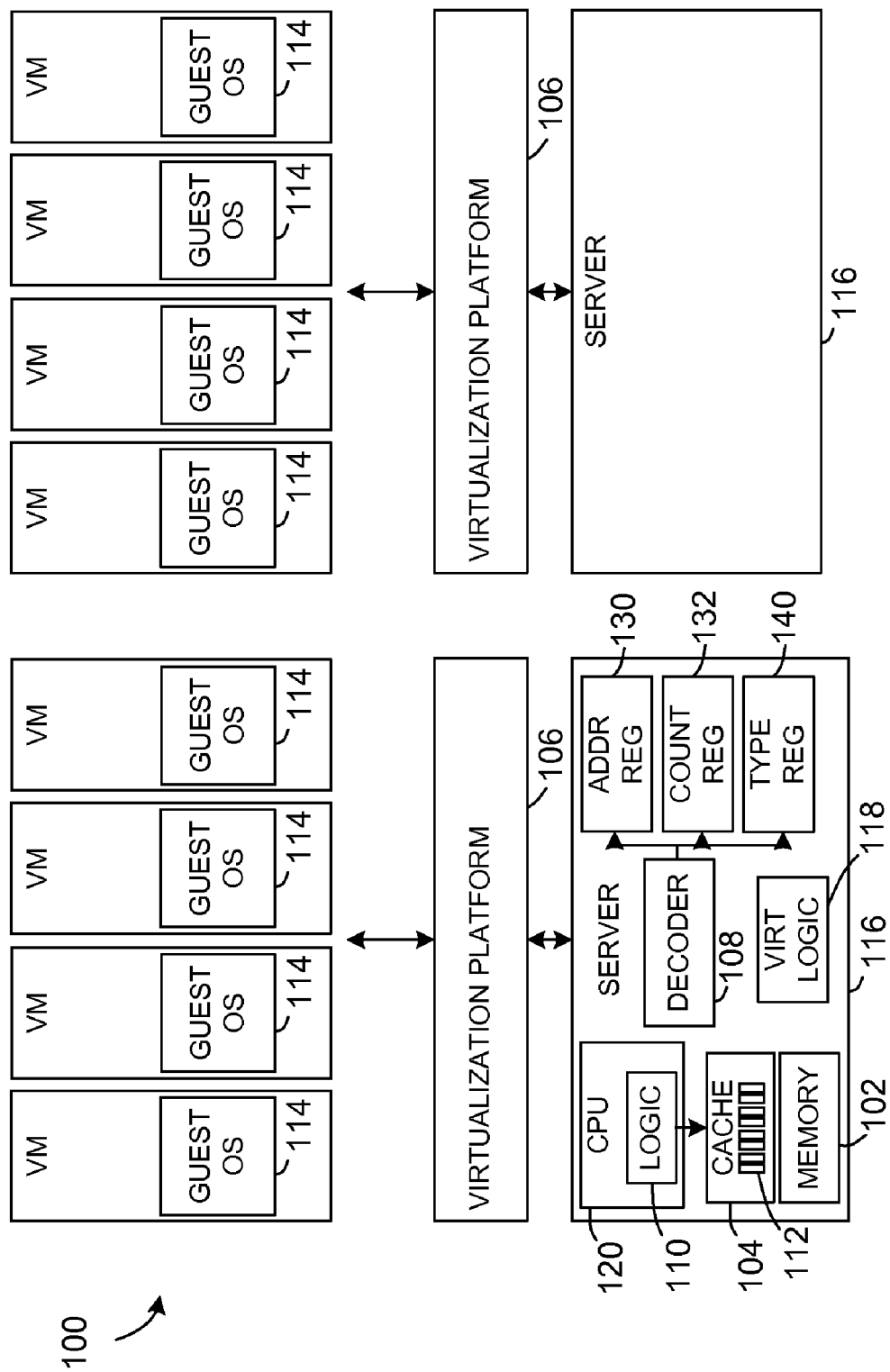
FIG. 1 is a schematic block diagram showing an embodiment of a computing system that supports a virtualization platform with dedicated cache access.

Referring to FIG. 1, a schematic block diagram illustrates an embodiment of a computing system 100 that supports a virtualization platform 106 with dedicated cache access. The illustrative computing system 100 is configured for usage with a memory 102 and a cache 104 and comprises an instruction decoder 108 configured to decode a cache-line allocation instruction and control logic 110. The control logic 110, for example executable within a processor 120, is coupled to the instruction decoder 108 and controls the computing system 100 to execute a cache-line allocation instruction that loads portions of data and code regions of the memory 102 into dedicated cache-lines 112 of the cache 104 which are exempted from eviction according to a cache controller replacement policy.

The instruction decoder 108 is configured to decode cache-line allocation instructions and cache-line de-allocation instructions. The control logic 110 coupled to the instruction decoder 108 executes the cache-line allocation instruction by attaching a specified region of memory to the dedicated cache-lines and executes the cache-line de-allocation instruction by de-attaching the attached specified region of memory whereby participation in the cache controller replacement policy is restored.

The computing system 100 can be implemented to include several registers associated with the instruction decoder 108. The registers can include an address register 130, a count register 132, and a cache type register 140. The address register 130 specifies a logical address of a target memory region for attaching to the cache for the cache-line allocation instruction and specifies a logical address of a target memory region for de-attaching to the cache for the cache-line de-allocation instruction. The count register 132 specifies a range in bytes to attach to the cache for the cache-line allocation instruction and specifies a range in bytes to de-attach from the cache for the cache-line de-allocation instruction. The cache-type register 134 can distinguish between an instruction-cache and a data-cache.

In some embodiments, the computing system 100 and instruction decoder 108 can be implemented with a cache-type register 134 that distinguishes between an instruction-cache, a data-cache, and a translation lookaside buffer.

The computing system 100 can further comprise a virtualization platform 106 that can run multiple operating systems 114 simultaneously on one or more physical servers 116. Virtualization logic 118 can load portions of virtualization platform data and code memory regions into dedicated cache-lines 112 that are exempted from eviction according to the cache controller replacement policy.

The virtualization platform 106 can be configured to perform global resource scheduling between multiple guest operating systems 114 by allocating cache-lines to data and code regions of the memory whereby predetermined critical operations are executed a predetermined maximum processor core frequency.

The predetermined critical operations may include host resource management including memory and processor management, page shadowing, page table management, exception handling, load balancing including runtime load balancing, event handling, and critical resource management, and others. For example, the critical operations can include basically any critical resource management that the hypervisor is to perform quickly, generally host Quality of Service (QoS) attributes.

The computing system 100 can further comprise a physical server 116 which is communicatively coupled to the virtualization platform 106 and configured to run the operating systems 114.

The virtualization platform 106 can be a hypervisor, a virtual machine monitor (VMM), or other suitable virtualization system. An example implementation of the baseboard management controller can be an embedded server management technology system such as integrated Lights-Out (iLO) from Hewlett-Packard Company of Palo Alto, Calif.

In contrast to the illustrative computing system 100 and associated technique which includes instructions for managing cache-line access, techniques that employ speculative instructions, such as PREFETCHh, do not guarantee cache temperature by the time software is ready to access the data. Virtualizing a platform creates a harsh execution environment that is less predictable than a single operating system running a set of applications. The illustrative computing system 100 and associated technique enables predictable performance for critical hypervisor code and data accesses in conditions of an unpredictable software environment.

Referring again to FIG. 1, in another embodiment a processor 120 is configured for usage with a memory 102 and a cache 104. The processor 120 can comprise an address register 130 and a count register 132. The address register 130 specifies a logical address of a target memory region for attaching to the cache 104 for a cache-line allocation instruction. The count register 132 specifies a range in bytes to attach to the cache 104 for the cache-line allocation instruction. The processor 120 further comprises a control logic 110 coupled to the address register 130 and the count register 132 that controls the processor 120 to execute the cache-line allocation instruction by loading portions of data and code regions of the memory 102 into dedicated cache-lines 112 of the cache 104 that are exempted from eviction according to a cache controller replacement policy.

In some embodiments, the address register 130 can specify a logical address of a target memory region for de-attaching to the cache 104 for a cache-line de-allocation instruction, and the count register 132 can specify a range in bytes to de-attach from the cache 104 for the cache-line de-allocation instruction. The control logic 110 controls the processor 120 to execute the cache-line de-allocation instruction by de-attaching the attached specified region of memory 102 whereby participation in the cache controller replacement policy is restored.

The processor 120 can further comprise a cache-type register 134 that distinguishes cache type for the cache allocation instruction and the cache de-allocation instruction. Cache types can include data cache or instruction cache. In some embodiments, the cache type relate to a translation lookaside buffer (TLB).

The processor 120 can further comprise a virtualization platform 106 that runs multiple operating systems simultaneously on one or more physical servers 116. Virtualization logic 118 can load portions of virtualization platform data and code memory regions into dedicated cache-lines that are exempted from eviction according to the cache controller replacement policy.

Figure 2:
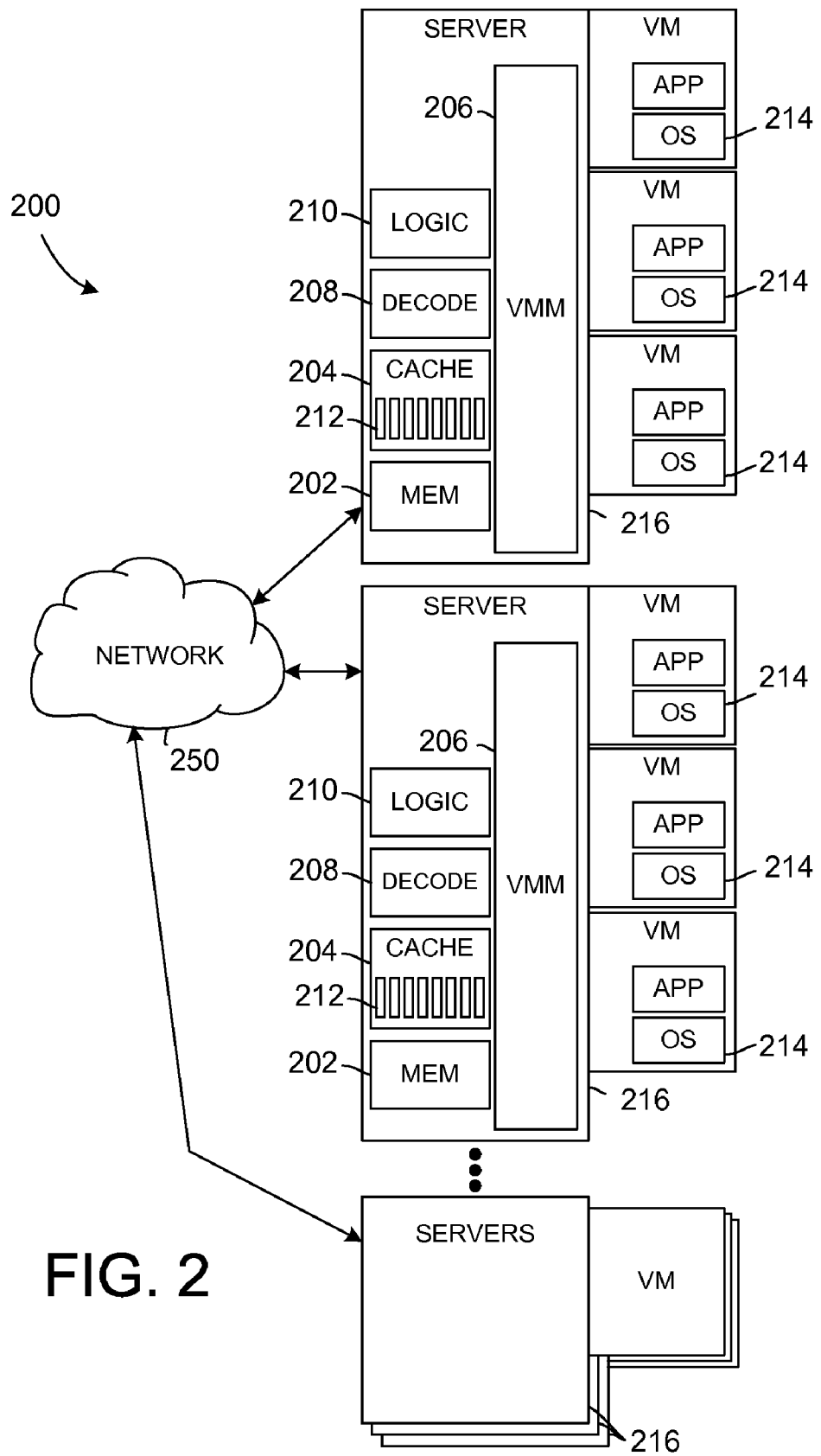
FIG. 2 is a schematic block diagram that depicts another embodiment of a network system including a computing system that supports a virtualization platform with dedicated cache access.

Referring to FIG. 2, a schematic block diagram depicts another embodiment of a virtualizing computing system 200 that supports a virtualization platform 206 with dedicated cache access. The illustrative computing system 200 comprises a network 250, multiple physical servers 216 communicatively coupled to the network 250 and a virtualization platform 206 which is configured to run multiple operating systems 214 which can simultaneously run the multiple physical servers 216. The computing system 200 is configured for usage with a memory 202 and a cache 204 and includes an instruction decoder 208 configured to decode a cache-line allocation instruction and control logic 210. The control logic 210 controls the computing system 200 to execute a cache-line allocation instruction that loads portions of data and code regions of the memory 202 into dedicated cache-lines 212 of the cache 204 which are exempted from eviction according to a cache controller replacement policy.

Figure 3C:
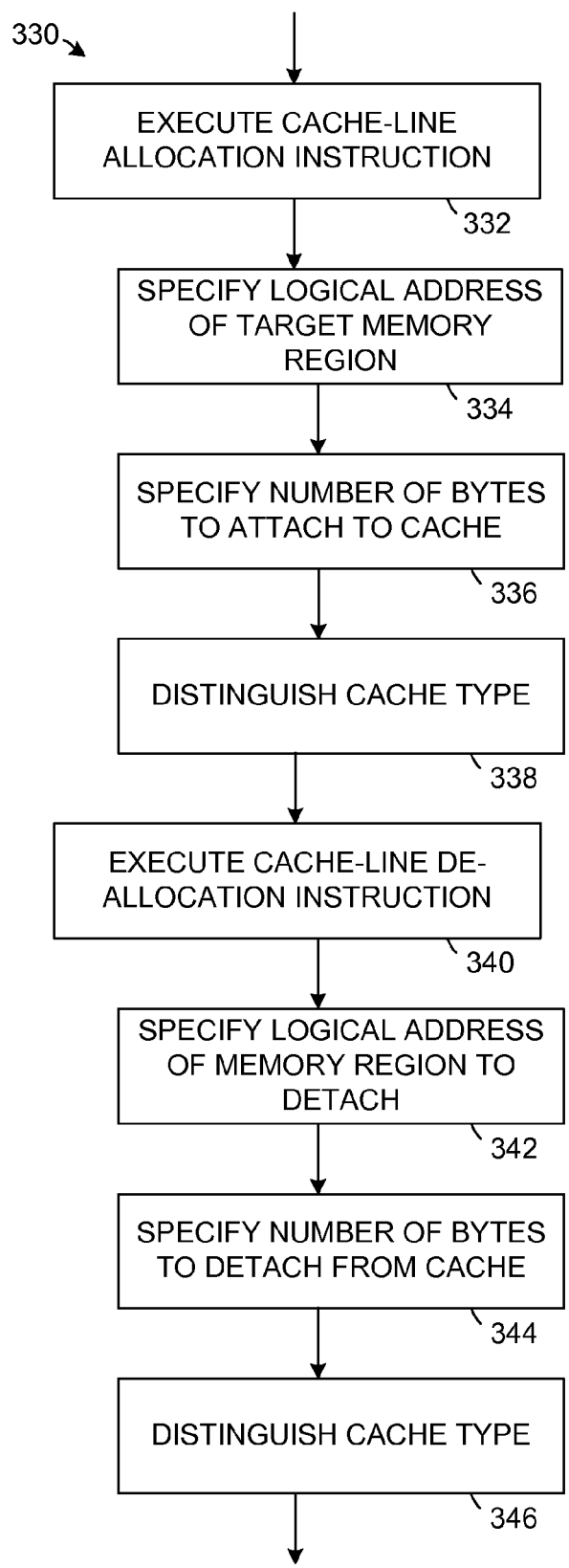

Referring to FIGS. 3A through 3D, flow charts illustrate one or more embodiments or aspects of a computer-executed method 300 for managing a virtualization platform with dedicated cache access. FIG. 3A depicts a computer-executed method 300 for executing an instruction on a processor comprising decoding 302 a cache-line allocation instruction and executing 304 the cache-line allocation instruction. Execution 304 of the cache-line allocation instruction comprises loading 306 portions of data and code regions of the memory into dedicated cache-lines of the cache, and exempting 308 the dedicated cache-lines from eviction according to a cache controller replacement policy.

Referring to FIG. 3B, a computer-executed method 310 can comprise decoding 312 the cache-line allocation instruction and executing 314 the cache-line allocation instruction by attaching 316 a specified region of memory to the dedicated cache-lines. A cache-line de-allocation instruction is decoded 318 and the cache-line de-allocation instruction is executed 320 by de-attaching 322 the attached specified region of memory whereby participation in the cache controller replacement policy is restored 324.

As shown in FIG. 3C, a computer-executed method 330 for executing instructions can comprise executing 332 the cache-line allocation instruction and executing 340 the cache-line de-allocation instruction. Executing 332 the cache-line allocation instruction comprises specifying 334 a logical address of a target memory region for attaching to the cache, specifying 336 a range in bytes to attach to the cache, and distinguishing 338 cache type, for example between an instruction-cache and a data-cache. Other implementations can distinguish other or addition types of storage. For example, the type of cache can be distinguished between instruction cache, data cache, translation lookaside buffer, and the like. Similarly, execution 340 of the cache-line de-allocation instruction can comprise specifying 342 a logical address of a target memory region for de-attaching to the cache, specifying 344 a range in bytes to de-attach from the cache, and distinguishing 346 between the instruction-cache and the data-cache.

Figure 3D:
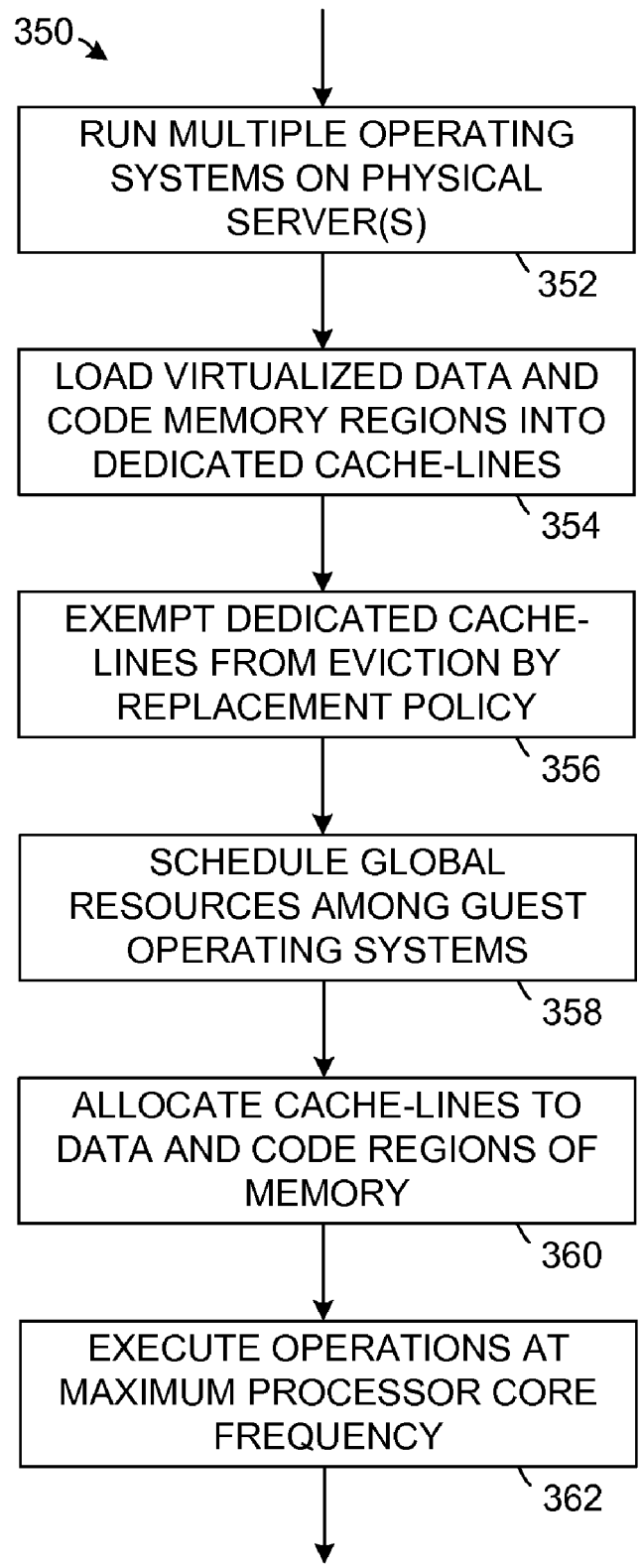

Referring to FIG. 3D, a computer-executed method 350 can comprise running 352 multiple operating systems simultaneously on one or more physical server, loading 354 portions of virtualized data and code memory regions into dedicated cache-lines, and exempting 356 the dedicated cache-lines from eviction according to the cache controller replacement policy.

In some embodiments, the method 350 can further comprise performing 358 global resource scheduling between a plurality of guest operating systems. The scheduling operation 358 can comprise allocating 360 cache-lines to data and code regions of the memory, and executing 362 predetermined critical operations at a predetermined maximum processor core frequency. Such critical operations can include memory and processor management, page shadowing, page table management, exception handling, load balancing including runtime load balancing, event handling, and critical resource management, and others.

Figure 4:
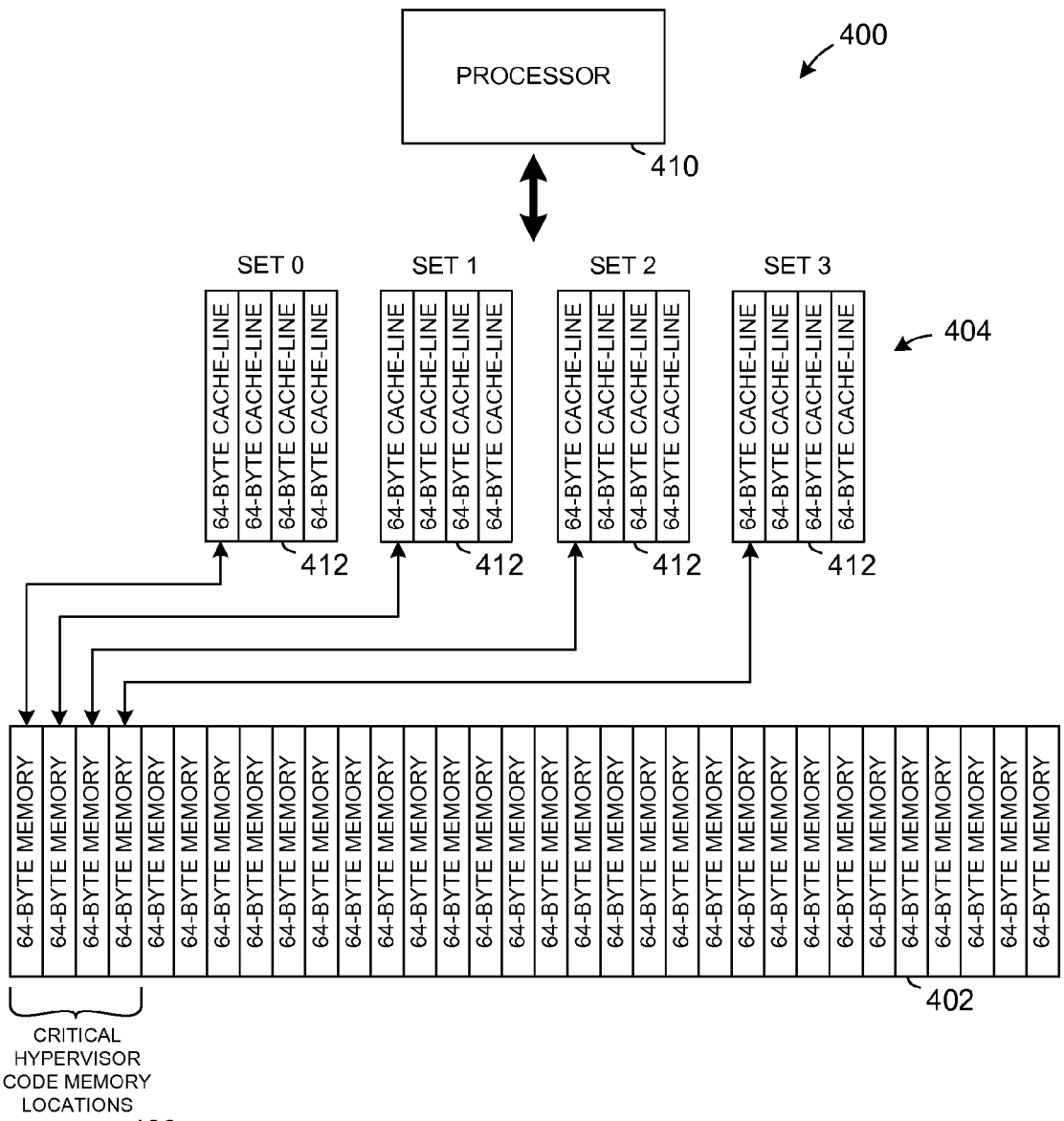
FIG. 4 is a schematic block diagram that depicts an embodiment of a computing system implementing instructions for managing cache accesses in a virtualized system.

Referring to FIG. 4, a schematic block diagram depicts an embodiment of a computing system 400 that implements instructions for managing cache accesses in a virtualized system. Two or more instructions are implemented to reserve and free cache-lines 412 in a cache hierarchy 404, for example CLALLOC and CLFREE instructions. The instruction semantics can be implemented in the following form:

CLALLOC(mem, len, i/d) in which mem designates a logical address of the target memory region to pin to the cache, len specifies the range in bytes to pin to the cache, and i/d indicates whether the cache is an instruction cache or data cache;

CLFREE(mem, len, i/d) in which mem designates a logical address of the target memory region to unpin from the cache, len specifies the range in bytes to unpin from the cache, and i/d indicates whether the cache is an instruction cache or data cache.

In other embodiments, other terms can be implemented. For example, the i/d term can be extended to an i/d/tlb term which specifies a third possibly type of cache for selection, a translation lookaside buffer.

The illustrative computing system 400 includes a processor 410, multiple sets of cache-lines 412, and memory 402. Virtualization platform code that is deemed critical for efficient operation is shown allocated to predetermined memory locations 420. In the highly simplified example, the virtualization platform code is sufficiently small to fit within the four cache-lines 412 in memory shown as cache-lines A, B, C, and D. The virtualization platform can issue the CLALLOC instruction with MEM pointing to the first block (A), LEN set to 256 bytes, and i/d set to i to indicate instruction cache pinning. Once the CLALLOC instruction is executed by the processor, the first four memory regions are allocated to a way in the cache within appropriate sets.

The illustrative computing system 400 and associated technique enable critical components of the hypervisor code and data regions to operate with guaranteed performance levels consistent with the internal rate of the target processor core. In contrast, systems that use speculative instructions only offer hints to the core's cache controller with no guarantee of performance.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for managing virtual machines (VMs) in a distributed network system.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed method for executing an instruction on a computing system comprising:
   decoding a cache-line allocation instruction;
   executing the cache-line allocation instruction comprising:
   loading portions of data and code regions of the memory into dedicated cache-lines of the cache; and
   exempting the dedicated cache-lines from eviction according to a cache controller replacement policy.

2. The method according to claim 1 further comprising:
   decoding the cache-line allocation instruction;
   executing the cache-line allocation instruction comprising attaching a specified region of memory to the dedicated cache-lines;
   decoding a cache-line de-allocation instruction; and
   executing the cache-line de-allocation instruction comprising de-attaching the attached specified region of memory to restore participation in the cache controller replacement policy.

3. The method according to claim 2 further comprising:
   executing the cache-line allocation instruction comprising:
   specifying a logical address of a target memory region for attaching to the cache;
   specifying a range in bytes to attach to the cache; and distinguishing between an instruction-cache and a data-cache; and executing the cache-line de-allocation instruction comprising:

specifying a logical address of a target memory region for de-attaching to the cache;

specifying a range in bytes to de-attach from the cache; and distinguishing between the instruction-cache and the data-cache.

4. The method according to claim 1 further comprising:

running a plurality of operating systems simultaneously on at least one physical server;

loading portions of virtualized data and code memory regions into dedicated cache-lines; and exempting the dedicated cache-lines from eviction according to the cache controller replacement policy.

5. The method according to claim 4 further comprising:

performing global resource scheduling between a plurality of guest operating systems comprising:

allocating cache-lines to data and code regions of the memory; and executing predetermined critical operations at a predetermined maximum processor core frequency.

6. The method according to claim 5 further comprising:

executing predetermined critical operations selected from a group consisting of host resource management including memory and processor management, page shadowing, page table management, exception handling, load balancing including runtime load balancing, event handling, and critical resource management.

7. A processor configured for usage with a memory and a cache comprising:

an address register that specifies a logical address of a target memory region for attaching to the cache for a cache-line allocation instruction;

a count register that specifies a range in bytes to attach to the cache for the cache-line allocation instruction; and a control logic coupled to the address register and the count register that controls the processor to execute the cache-line allocation instruction comprising loading portions of data and code regions of the memory into dedicated cache-lines of the cache that are exempted from eviction according to a cache controller replacement policy.

8. The processor according to claim 7 further comprising:

the address register that specifies a logical address of a target memory region for de-attaching to the cache for a cache-line de-allocation instruction;

the count register that specifies a range in bytes to de-attach from the cache for the cache-line de-allocation instruction; and the control logic coupled to the address register and the count register that controls the processor to execute the cache-line de-allocation instruction by de-attaching the attached specified region of memory to restore participation in the cache controller replacement policy.

9. The processor according to claim 8 further comprising:

a cache-type register that distinguishes cache type for the cache allocation instruction and the cache de-allocation instruction.

10. The processor according to claim 7 further comprising:

a virtualization platform configured to run a plurality of operating systems simultaneously on at least one physical server; and a virtualization logic that loads portions of virtualization platform data and code memory regions into dedicated cache-lines that are exempted from eviction according to the cache controller replacement policy.

11. A computing system configured for usage with a memory and a cache comprising:

an instruction decoder configured to decode a cache-line allocation instruction; and a control logic coupled to the instruction decoder that controls the computing system to execute the cache-line allocation instruction comprising loading portions of data and code regions of the memory into dedicated cache-lines of the cache that are exempted from eviction according to a cache controller replacement policy.

12. The system according to claim 11 further comprising:

the instruction decoder configured to decode the cache-line allocation instruction and a cache-line de-allocation instruction;

the control logic coupled to the instruction decoder that executes the cache-line allocation instruction by attaching a specified region of memory to the dedicated cache-lines, and that executes the cache-line de-allocation instruction by de-attaching the attached specified region of memory to restore participation in the cache controller replacement policy.

13. The system according to claim 12 further comprising:

an address register coupled to the instruction decoder that specifies a logical address of a target memory region for attaching to the cache for the cache-line allocation instruction and that specifies a logical address of a target memory region for de-attaching to the cache for the cache-line de-allocation instruction;

a count register coupled to the instruction decoder that specifies a range in bytes to attach to the cache for the cache-line allocation instruction and that specifies a range in bytes to de-attach from the cache for the cache-line de-allocation instruction; and a cache-type register coupled to the instruction decoder that distinguishes between an instruction-cache and a data-cache.

14. The system according to claim 13 further comprising:

the cache-type register coupled to the instruction decoder that distinguishes between an instruction-cache, a data-cache, and a translation lookaside buffer.

15. The system according to claim 11 further comprising:

a virtualization platform configured to run a plurality of operating systems simultaneously on at least one physical server; and a virtualization logic that loads portions of virtualization platform data and code memory regions into dedicated cache-lines that are exempted from eviction according to the cache controller replacement policy.

16. The system according to claim 15 further comprising:

the virtualization platform configured to perform global resource scheduling between a plurality of guest operating systems comprising allocating cache-lines to data and code regions of the memory to allow predetermined critical operations to be executed a predetermined maximum processor core frequency.

17. The system according to claim 16 further comprising:

the predetermined critical operations are selected from a group consisting of host resource management including memory and processor management, page shadowing, page table management, exception handling, load balancing including runtime load balancing, event handling, and critical resource management.

18. The system according to claim 11 further comprising:

a physical server communicatively coupled to the virtualization platform and configured to run the operating system plurality.

19. The system according to claim 11 further comprising:
a network;
the plurality of physical servers communicatively coupled to the network and the virtualization platform, and configured to run the operating system plurality; and
the plurality of operating systems simultaneously running on at least one physical server.

20. An article of manufacture comprising:
a controller-usable medium having a computer readable program code embodied in a controller for executing an instruction, the computer readable program code further comprising:
code causing the controller to decode a cache-line allocation instruction;
code causing the controller to execute the cache-line allocation instruction by loading portions of data and code regions of the memory into dedicated cache-lines of the cache, and exempting the dedicated cache-lines from eviction according to a cache controller replacement policy;
code causing the controller to decode a cache-line de-allocation instruction; and
code causing the controller to execute the cache-line de-allocation instruction comprising de-attaching the attached specified region of memory to restore participation in the cache controller replacement policy.

* * * * *

UNITED STATES PATENT AND TRADEMARK OFFICE
CERTIFICATE OF CORRECTION

| | | |
|---|---|---|
| PATENT NO. | : 8,041,896 B2 | Page 1 of 1 |
| APPLICATION NO. | : 12/113076 | |
| DATED | : October 18, 2011 | |
| INVENTOR(S) | : Thomas J. Bonola | |

It is certified that error appears in the above-identified patent and that said Letters Patent is hereby corrected as shown below:

In column 8, line 55, in Claim 16, delete "executed a predetermined" and insert -- executed at a predetermined --, therefor.

Signed and Sealed this
Nineteenth Day of June, 2012

David J. Kappos
*Director of the United States Patent and Trademark Office*